Aug. 8, 1944.  H. AKIN, SR  2,355,498
SECTIONAL BOLT
Filed June 28, 1943
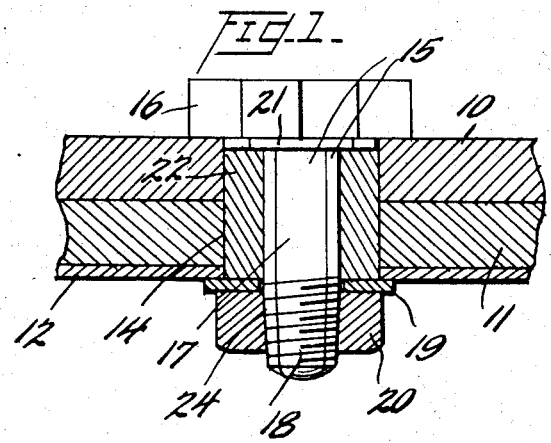
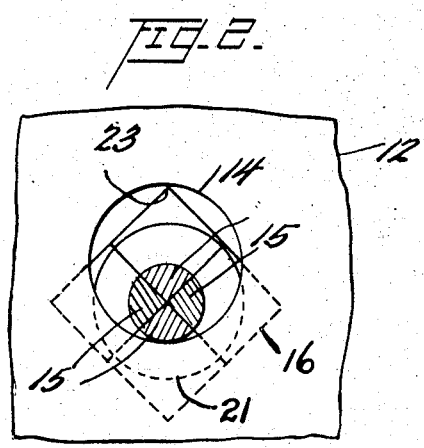
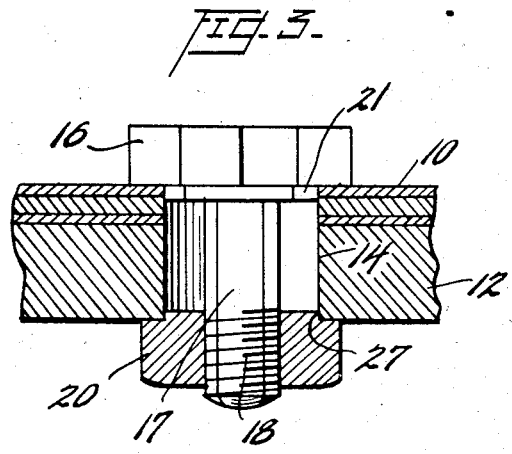
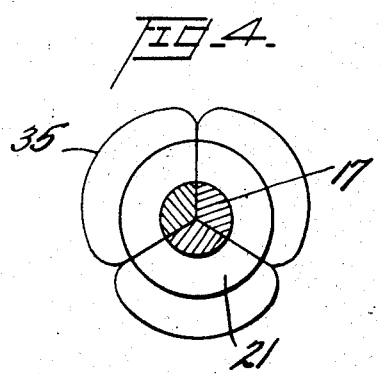
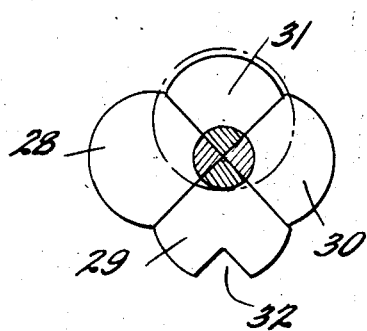
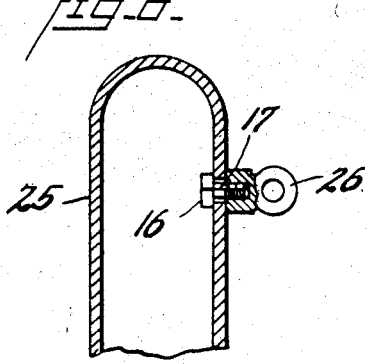
Inventor
Hughton Akin, Sr.,
By Henry H. Snelling
Attorney Patented Aug. 8, 1944

2,355,498

UNITED STATES PATENT OFFICE 2,355,498

SECTIONAL BOLT

Hughlon Akin, Sr., Jackson, Tenn.

Application June 28, 1943, Serial No. 492,607

8 Claims. (Cl. 85—1)

This invention relates to sectional bolts and has for its principal object the provision of a simple and efficient bolt of three or four pieces of identical size and shape for use through a hole in a single base as a pipe or post, or through alined holes in two or more members to be secured together, in such cases as where the far side of the hole is either blind or accessible only with difficulty. A typical example would be in connection with certain pieces of farm machinery where the bolt is too long to be inserted from the far side of the hole because of lack of space on that side and where consequently the head of the bolt must be inserted from the near side and the nut or other securing means is applied on the same side.

A further object of the invention is to provide a sectional bolt having means for positioning the shank centrally of the hole. Since the shank of the bolt is so much smaller than the hole, unless a central spacer is used, the means may be a slight shoulder on the nut or on the bolt head or on both, or may be a sleeve. Where the latter is employed it may be loose on the shank, fitting it snugly, or be threaded to the shank to be applied after the sections of the bolt have been assembled in place in the hole.

A still further object of the invention is to provide a sectional bolt in which the several head portions are each of the largest size that will enter the hole with the preceding sections in place whereby the greatest overhang on the blind side is secured.

These and other objects are achieved by the bolts illustrated in the accompanying drawing, in which:

Figure 1 is a central section through a joint with the bolt in side elevation.

Figure 2 is a section through the shank of the bolt showing the last section as just having been inserted through the hole.

Figures 3, 4, 5, and 6 show modified forms.

Referring particularly to Figure 1, there are three sheets or other members 10, 11, and 12 which are to be secured together. A hole 14 has been made through these pieces from 12 to 10, the upper side of the joint being blind, that is, it is not accessible so that a solid bolt may be inserted from 10 to 12. The sectional bolt in this figure consists of four identical sections 15, each with a head portion 16, and a shank 17, the latter having a threaded portion 18 to engage the nut 20. The washer 19 is optional as is the slight shoulder 21 on the lower side of the head 16. This shoulder is particularly advantageous where the sleeve 22 is omitted as it insures the accurate positioning of the bolt in the opening. The sleeve 22 preferably fits the hole and shank with but slight tolerance and in some cases might have a threaded engagement with the shanks of the sections although generally the cost of this construction would outweigh the advantages inherent in the substantially solid body.

As best seen in Figure 2, each of the four head portions 16 are square in plan and of such a size that the diagonal of the head portion plus the radius of the shank is substantially equal to the diameter of the hole 14. The shoulder 21 may be as deep as desired but a very slight cylindrical ridge will serve to position the assembled sections coaxial with the hole. The heads of the sections are inserted in the hole successively and then moved so as to offer least restriction to the insertion of the next section. In Figure 2, through the hole, three of the sections have been inserted and are held together with the edge of the shank of the middle section resting on the edge of the hole. As illustrated the last of the four sections has just been inserted by sliding this last section on the assembled three sections. When the last section is in place the assembled bolt is centered in the hole at which time the shoulders will fit the hole.

Where the amount of overhang is relatively unimportant the head is square and the point 23 just clears the margin of the hole. Where more overhang is desired the head of the bolt is made round, instead of square as in this figure, and this gives greater clearance.

In Figures 3, 4 and 5 the boundary arcs or curves are selected to give maximum overhang of the head in the blind side. It is sometimes convenient to taper the threaded ends as at 24 for quicker assembly with the nut 20.

The form shown in Figure 3 is a simple one in which four identical sections are employed, the head being either round or square and an additional positioning means being furnished by having a shoulder 27 on the nut 20 cooperating with the shoulder 21 on the underside of the head.

In Figure 4 a modification is shown, the bolt now being in three identical sections, each with a shank 17 and a shoulder 21. In this case the amount of overhang, that is the radial distance from the shoulder to the midpoint 35 of the curve, varies with the diameter of the shank so that a compromise between tensile strength of the shank and area of contact of the bottom of the head on the blind side may be made depending on the condition and purpose of the joint and the kind of materials forming the members to be secured together.

Where maximum overhang is desired the form illustrated in Figure 5 may be used. Here the heads are unequal, 28 having the largest area that will enter the hole, 29 having a V-notch 32 to clear the shank of section 28 when the latter is in the hole and has been turned to offer minimum obstruction, 30 having an arcuate margin just to clear the hole when the first two are in position to offer minimum obstruction and the last section 31 having an arc of somewhat less radius, as in this case it must be inserted with the vertex of its right angle nearer to the axis of the hole than is the case with the third section as is obvious from the figure which shows the last section being slid into place preparatory to moving the bolt so that the shaft will be centrally of the hole.

Incidentally, as heretofore suggested, my bolt may be used with only one member, as for example, in stopping leaks in a closed tank or shell or pipe, or where the main purpose is to provide a hook or an eye. In the latter case, illustrated in Figure 6, the bolt is suitable for use in an overhead ceiling, a wall or floor, or a post 25 as shown. The bolt is of three or four sections with shanks 17 and heads 16 on the inside of the post. The nut in this case carries an eye 26 and might be a mere means for holding a strand of a wire, chain or cable fence but more generally would be a general purpose hook.

What I claim is:

1. The combination with a longitudinally divided bolt having a shank of less diameter than the hole in which it is to go, of a sleeve within the hole and surrounding the shanks of the assembled sections of the bolt, said sleeve being concentric with the hole and the axis of the bolt and fitting both the hole and the assembled shanks.

2. In combination, a sectional bolt of a plurality of separate sections, each with a head, a threaded shank and a shoulder at the junction of the head and shank, and a nut threaded to receive the assembled sections and having a circular shoulder of the same diameter as the assembled shoulders of the bolt sections, whereby when the bolt and nut are assembled in a hole of the same diameter as the two shoulders, the bolt shanks will be centered in the hole so that each of the several sections takes the same load.

3. The device of claim 2 in which a hollow cylindrical spacer fits the assembled shank and is of the same diameter as the shoulders so as to fit snugly the hole.

4. The device of claim 2 in which the bolt sections are identical and are three in number.

5. The device of claim 2 in which each shank has two flat sides normal to each other.

6. A longitudinally divided bolt and a nut fitting the assembled sections of the bolt and having centering means, said bolt having a circular shoulder cooperating with the means on the nut to assist in centering the bolt, whereby to prevent unequal tension in the several sections of the bolt.

7. A longitudinally divided bolt to be placed in a cylindrical hole, consisting of three sections each having a head portion bounded by a smooth curve and two radial sides and together having a circular shoulder to fit the hole, the radial dimensions from the axis of the bolt assembly of the shank portion, the shoulder portion, and the overhang of the head being roughly equal, and the shank diameter being one-half the diameter of the hole, the circular shoulder comprising adjoining flanges on each section forming a single continuous flange on the assembled bolt.

8. In a mechanical assembly for engaging parallel surfaces of perforated sheets, where the perforation is a circular hole and the far side of the hole is blind or is accessible only with difficulty, a plurality of sections each having a head and a threaded shank, said sections together forming a sectional bolt member, the shank of which is materially smaller in diameter than the diameter of the circular hole, and a nut member threaded to fit the assembled bolt member sections, one of said members having an integral circular shoulder to fit snugly within the circular hole to assist in centering the bolt member within the hole with the axis of the bolt member in exact registry with the axis of the hole and leaving a space between the shank of the sectional bolt member and the surface of the cylindrical hole.

HUGHLON AKIN, Sr.